US008359193B2

(12) United States Patent
Chen et al.

(10) Patent No.: US 8,359,193 B2
(45) Date of Patent: Jan. 22, 2013

(54) PRE-HIGHLIGHTING TEXT IN A SEMANTIC HIGHLIGHTING SYSTEM (75) Inventors: Feng-Wei Chen, Cary, NC (US); Julius Goth, III, Raleigh, NC (US); John A. Medicke, Raleigh, NC (US); William D. Reed, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 12/650,671

(22) Filed: Dec. 31, 2009

(65) Prior Publication Data

US 2011/0161070 A1 Jun. 30, 2011

(51) Int. Cl.
G06F 17/27 (2006.01)
(52) U.S. Cl. .......................................... 704/9; 704/270
(58) Field of Classification Search ............... 704/9, 270
See application file for complete search history.

(56) References Cited

U.S. PATENT DOCUMENTS

| 5,929,856 | A | 7/1999 | LoNegro et al. |
|---|---|---|---|
| 5,983,170 | A | 11/1999 | Goodman |
| 7,171,351 | B2 | 1/2007 | Zhou |
| 7,263,671 | B2 | 8/2007 | Hull et al. |
| 7,479,968 | B2 | 1/2009 | Brown et al. |
| 7,668,718 | B2 * | 2/2010 | Kahn et al. ............... 704/270 |
| 2005/0108001 | A1 | 5/2005 | Aarskog |
| 2005/0154994 | A1 | 7/2005 | Chen et al. |
| 2006/0080598 | A1 | 4/2006 | Bargeron et al. |
| 2006/0156222 | A1 | 7/2006 | Chi et al. |
| 2006/0271353 | A1 | 11/2006 | Berkan et al. |
| 2007/0073533 | A1 | 3/2007 | Thione et al. |
| 2007/0100800 | A1 | 5/2007 | Rose et al. |
| 2007/0100915 | A1 | 5/2007 | Rose et al. |
| 2007/0176944 | A1 | 8/2007 | Brown et al. |
| 2008/0184101 | A1 | 7/2008 | Joshi et al. |
| 2009/0019356 | A1 | 1/2009 | Deyab et al. |
| 2009/0063472 | A1 | 3/2009 | Pell et al. |

OTHER PUBLICATIONS

Hoeber et al. "Interactive Web Information Retrieval Using Wordbars" IEEE, 2006, pp. 1-8.
Chi et al. "Scenthighlights: Highlighting Conceptually-Related Sentences During Reading" IUI'05, Jan. 10-13, 2005, San Diego, California, USA, pp. 1-3.
Kawasaki et al. "Effectiveness of Highlighting As a Prompt in Text Reading on a Computer Monitor" 8th WSEAS International Conference on Multimedia Systems and Signal Processing, Athens, Greece, 2008, pp. 311-315.

* cited by examiner

*Primary Examiner* — Susan McFadden
(74) *Attorney, Agent, or Firm* — Law Office of Jim Boice (57) ABSTRACT

A method, computer system and/or computer program product pre-highlight text that is located in a search. A text highlight and a triple statement semantic annotation based on the text highlight of a first document are received. The triple statement semantic annotation comprises a subject, a relationship and an object. A natural language processing (NLP) pattern based on the triple statement semantic annotation is generated. The NLP pattern is representative of a linguistic pattern between the text highlight and the triple statement semantic annotation. A multi-dimensional linguistic profile is generated based on the text highlight, the triple statement semantic annotation and the NLP pattern, wherein the multi-dimensional linguistic profile defines entities, relationships and attributes associated with document text. Text in a second document is compared with the multi-dimensional linguistic profile, and text in the second document is highlighted based on the comparison.

18 Claims, 5 Drawing Sheets

PRE-HIGHLIGHTING TEXT IN A SEMANTIC HIGHLIGHTING SYSTEM

BACKGROUND

The present disclosure relates to the field of computers, and specifically to information displayed on computers. Still more particularly, the present disclosure relates to highlighting of information displayed on computers.

BRIEF SUMMARY

A method, computer system and/or computer program product pre-highlight text that is located in a search. A text highlight and a triple statement semantic annotation based on the text highlight of a first document are received. The triple statement semantic annotation comprises a subject, a relationship and an object. A natural language processing (NLP) pattern based on the triple statement semantic annotation is generated. The NLP pattern is representative of a linguistic pattern between the text highlight and the triple statement semantic annotation. A multi-dimensional linguistic profile is generated based on the text highlight, the triple statement semantic annotation and the NLP pattern, wherein the multi-dimensional linguistic profile defines entities, relationships and attributes associated with document text. Text in a second document is compared with the multi-dimensional linguistic profile, and text in the second document is highlighted based on the comparison.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
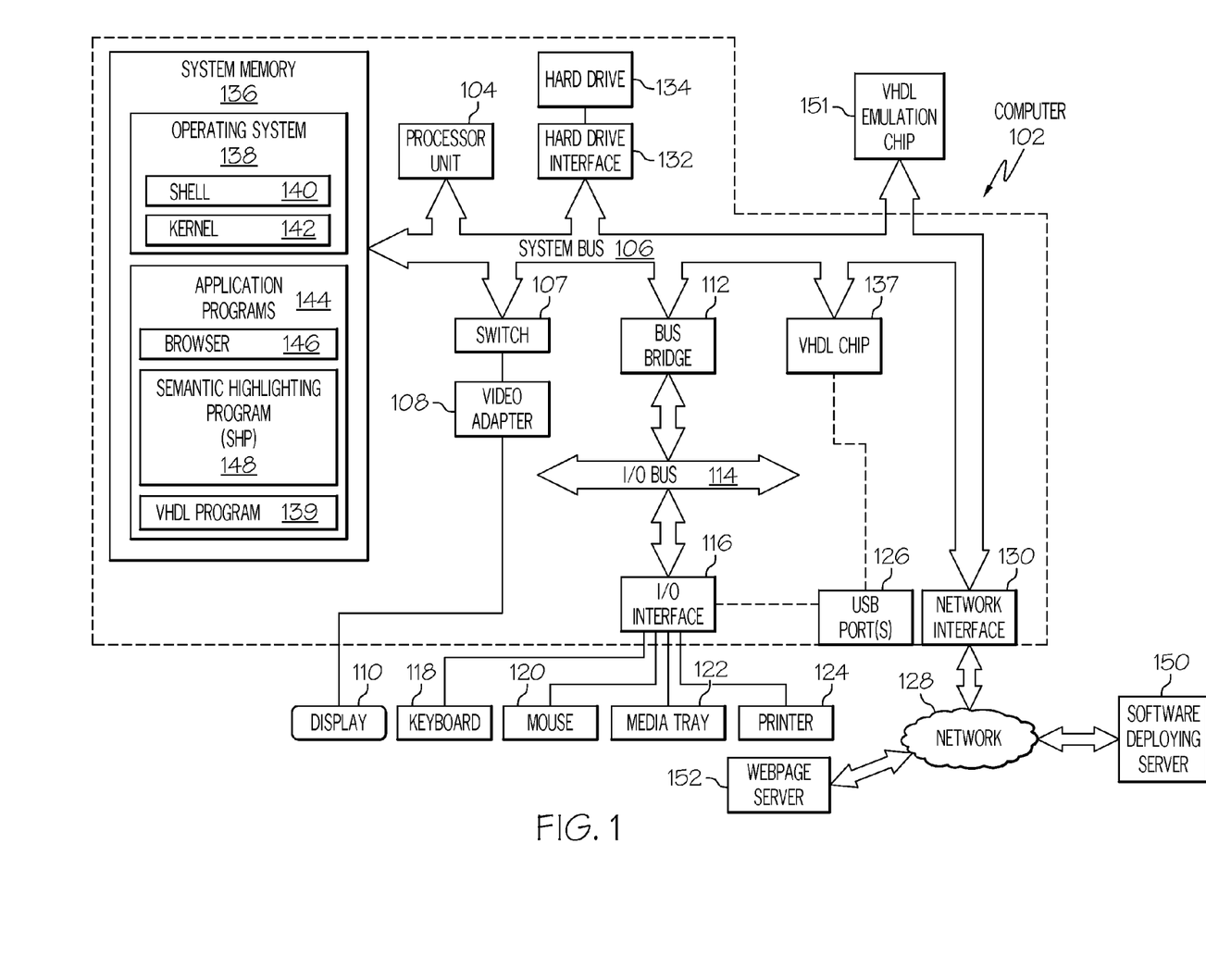
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, and/or a webpage server 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., semantic highlighting program—SHP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150, status notification server 152, and/or other status message implementing computer(s) 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a semantic highlighting program (SHP) 148. SHP 148 includes code for implementing the processes described below, including those described in FIGS. 2-5. In one embodiment, computer 102 is able to download SHP 148 from software deploying server 150, including in an on-demand basis, such that the code from SHP 148 is not downloaded until runtime or otherwise immediately needed by computer 102. Note further that, in one embodiment of the present disclosure, software deploying server 150 performs all of the functions associated with the present disclosure (including execution of SHP 148), thus freeing computer 102 from having to use its own internal computing resources to execute SHP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SHP 148 causes VHDL program 139 to configure VHDL chip 137, which may be an FPGA, ASIC, etc.

In another embodiment of the present disclosure, execution of instructions from SHP 148 results in a utilization of VHDL program 139 to program a VHDL emulation chip 151. VHDL emulation chip 151 may incorporate a similar architecture as described above for VHDL chip 137. Once SHP 148 and VHDL program 139 program VHDL emulation chip 151, VHDL emulation chip 151 performs, as hardware, some or all functions described by one or more executions of some or all of the instructions found in SHP 148. That is, the VHDL emulation chip 151 is a hardware emulation of some or all of the software instructions found in SHP 148. In one embodiment, VHDL emulation chip 151 is a programmable read only memory (PROM) that, once burned in accordance with instructions from SHP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Presented herein is a smart and/or semantic highlighter system that improves a user's ability to capture, retain, and share semantic facts discovered on resources, including but not limited to the World Wide Web (Web). The semantic highlighter described herein remembers more than just the text strings that are highlighted. It gleans real structured information from the text and organizes it for access later. For example, the string "Abraham Lincoln was on born on Feb. 12, 1809" can be represented using semantic Web triple notation as "/person/Abraham Lincoln, born on, Feb. 12, 1809" in a semantic repository. To correctly implement a semantic highlighter, pre-highlighting assists the user by looking for potential highlights or facts that the user might be interested in. This pre-highlighting marries the user's profile information with the text of the page to identify parts of the text that the user may be interested in. It is an adaptive learning system that better fits the suggested highlights to the user as the user trains the system by use. The present disclosure takes advantage of the fact that highlighting may be a unique human behavior (either found in manual highlighting activities, or alternatively, from a user's profile, which is used to automatically highlight text). In either case, highlighting provides rich semantic insights into what a particular user or type (class, identified group, identified category of user, etc.) of user deems important. Therefore, text that is highlighted is more semantically significant than text that is not highlighted. When multiple users highlight, the aggregate of highlights provides semantic information about a community.

There are two dimensions of a highlight action by a user. The first dimension is the content of the highlighted text. The content reveals semantic facts that are significant to the user. The second dimension is the user's highlighting behavior. In addition to the content, the way the user highlights is unique, and thus skews the content model to the user's unique perspective. Some people are verbose highlighters and others are concise. Some users may focus in on entities or dates or concepts when they highlight. A user who prefers to highlight dates will highlight dates across different content domains. Therefore, the system described herein accommodates both a user's content preferences and their highlighting behavior by storing such preferences in a user profile.

Figure 2:
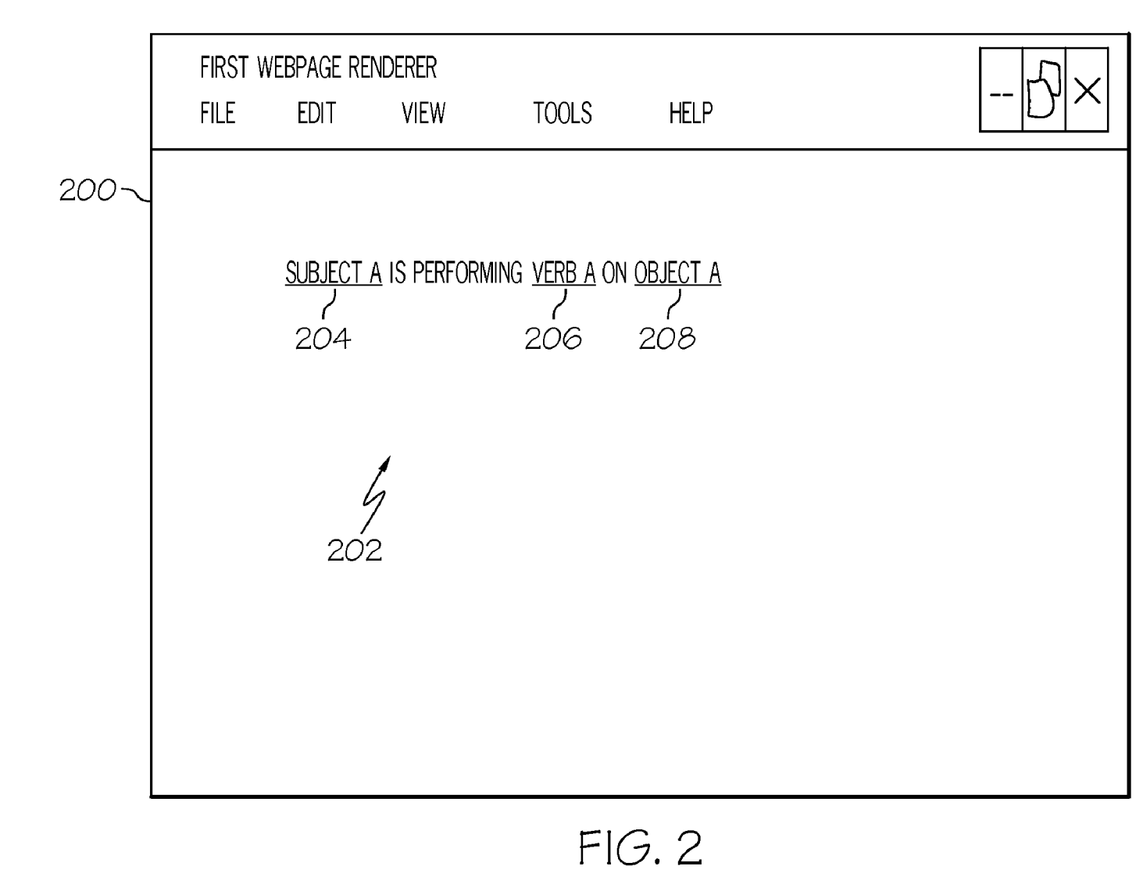
FIG. 2 illustrates a first exemplary graphical user interface (GUI) displaying highlighted text from a first displayed content.

With reference now to FIG. 2, depicted is a graphical user interface (GUI) 200 on which is displayed content 202 (e.g., from a first webpage). Within displayed content 202 are three highlighted texts (204, 206, and 208). In the example shown the highlighted texts make up a semantic Web triple notation, in which highlighted text 204 is a subject of a sentence, highlighted text 206 is the verb for that sentence, and highlighted text 208 is a modifier (in the example shown, an object of VERB A). As an example, the highlighted displayed content 202 could be "Company A (204) is buying (206) Company B (208)." While highlighted text 208 is shown as an object of the verb (206), in other embodiments highlighted text 208 may be any selected modifier, including a predicate nominative (e.g., describing or renaming the subject (204), an adjective describing the subject (204), an adverb describing the verb (206), etc. In one embodiment, the highlighted text has been manually highlighted by a user, indicating the user's interest in the semantic Web triple notation that is part of the displayed content 202. In another embodiment, the highlighted text is automatically highlighted in accordance with a descriptor file (e.g., for the user). For example, assume that the descriptor file describes the user as an investor who is interested in companies purchasing other companies. Using this information and a generic Web triple template (in which the first element is "Company" or some synonym of company; the second element is "Buys" or some synonym of buys; and the third element is "Company" or some synonym of company), the relevant triple components are automatically highlighted. Thus, these descriptors can be for an individual, a group of users, etc.

Figure 3:
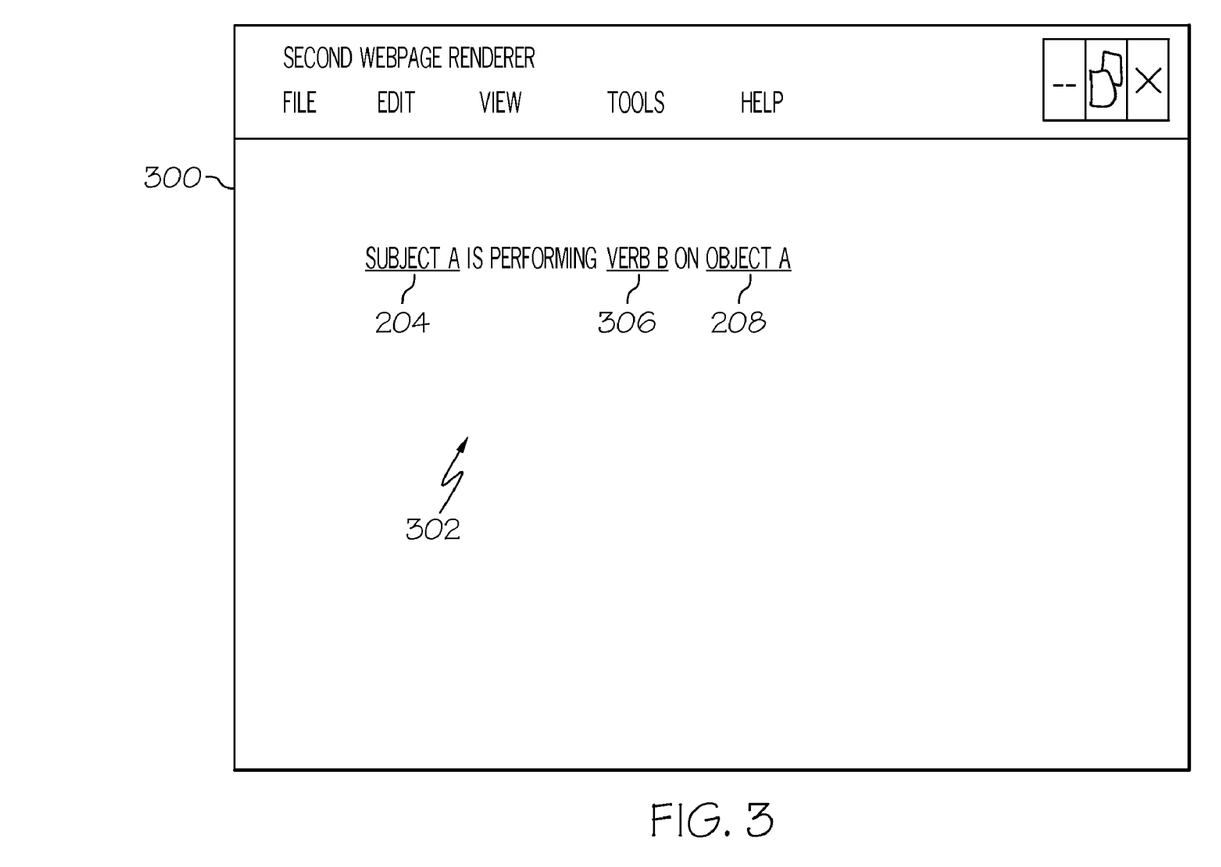
FIG. 3 depicts a second illustrates a second exemplary GUI displaying text that has been highlighted according to a pattern generated from the highlighted text in the first GUI.

FIG. 3 illustrates a second exemplary GUI 300, which is displaying content 302 from a second webpage (e.g., from webpage server 152 shown in FIG. 1). For illustrative purposes, assume that this second webpage was located by a search engine that was looking for Company A (204). The search engine found the second webpage about Company A (204), which is still doing something with/to Company B (208); however, the verb describing this action has changed (306). That is, the new verb may simply be a synonym for the verb (206) found in FIG. 2 (e.g., "acquires" instead of "buys), or the new verb (306) may be an entirely different verb (e.g., "sells", "sues", etc.) Either way the user is likely to be interested in the content of the displayed content 302 found in the webpage rendered on GUI 300.

Figure 4:
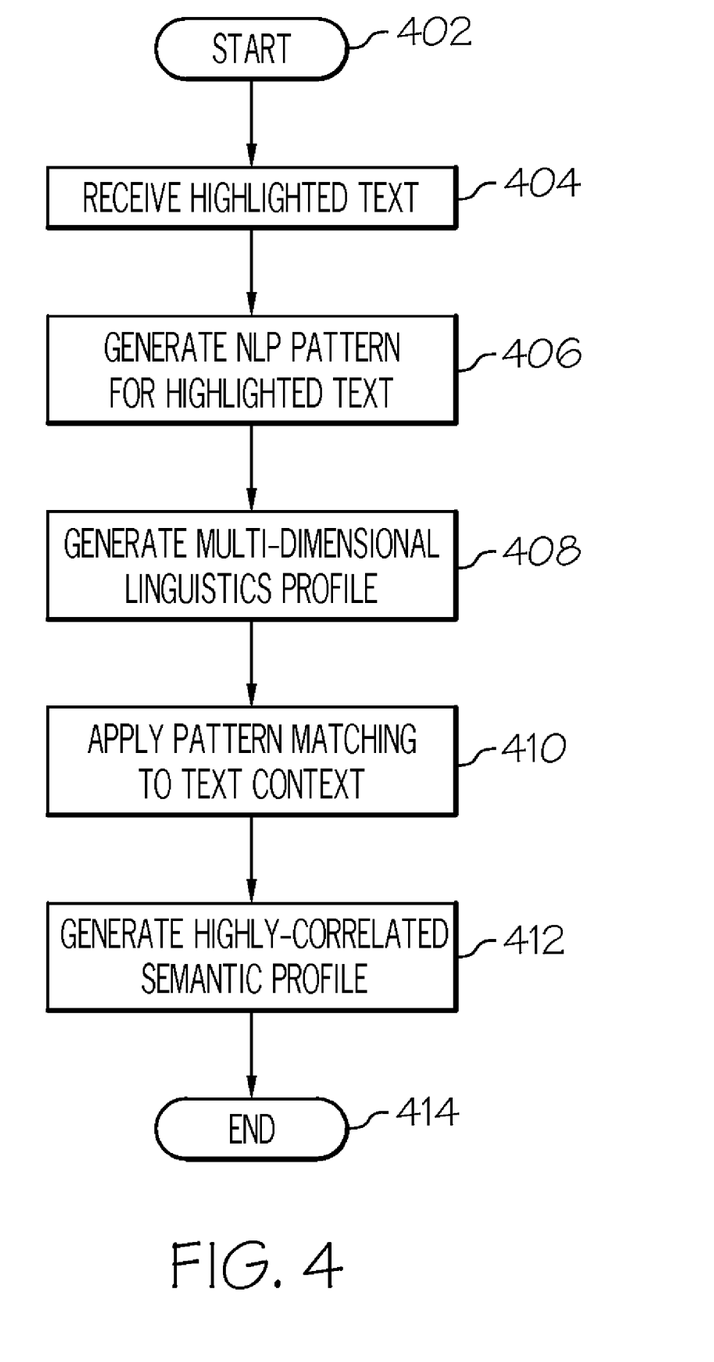
FIG. 4 is a high-level flow-chart of one or more exemplary steps performed by a processor to automatically highlight displayed text.

With reference now to FIG. 4, a high-level flow-chart of one or more exemplary steps performed by a processor to automatically highlight displayed text is presented. After initiator block 402, a processor receives a text highlight of a first document and a triple statement semantic annotation based on the text highlight (block 404). The triple statement semantic annotation includes a subject, relationship and an object, as shown in exemplary manner in FIG. 2 as respective elements 204, 206, and 208. In one embodiment, this highlighted text is manually highlighted by a user on a first displayed content. In one embodiment, this highlighted text is processed using natural language processing (NLP) code to pattern the highlighted text (e.g., into a triple). The NLP code retrieves the entities and possible verb groups discovered in highlighted sections of the displayed content (e.g., a sentence). According to the entities and verb groups discovered in the sentence, the following cases are possible:

Category: where there is only one entity and no verb (For example: John Doe);
Relationship: where there are more than two entities and one or more verbs present (e.g., Company A acquired Company B); and
Attribute: where there are attribute entities in the sentences. An attributes entity refers to another entity, and is used to describe the other entity's attribute, and normally does not need further explanation (for example, in the sentence "Company A was founded in 1896," year 1896 is an attribute entity).

To allow flexible annotation for the entities, the following possible options are united to recommend suggestions to improve the accuracy:

LastSubject: keep track of what the last subject in the session was;
LastObject: keep track of what the last object in the session was; and
NLP entities discovered: all the entities discovered in NLP.

To allow for flexible annotations in the verb and attribute relationship, the following possible options can be united to recommend suggestions:

NLP verb discovered: verb; and
Typeahead retrieved from the relationship or attribute name from the database.

That is, the NLP verb can be discovered by "looking forward" in the sentence and/or the rest of the displayed content.

The user's choice of semantic triples can then be stored in a repository. Alternately, the user's choice is not actually made by the user, but is made by logic that has access to information about the user. As described above, if this logic is aware that the user is an inventor who is interested in Company A, then any webpage related to Company A may be pulled up and highlighted according to the NLP triple developed below.

As described in block 406, NLP patterns, based on the triple statement semantic annotation, for the highlighted text are then generated. These NLP patterns are representative of a linguistic pattern between the text highlight and the triple statement semantic annotation. In one embodiment, the semantic triple data is captured in a database repository. This database repository captures the original highlighted text, the semantic triples, and the highlight owner. For example, consider the data shown in Table 1, which can be used to reverse engineer and generate an NLP pattern.

TABLE 1

| subject | relationship | object | original text | NLP pattern |
| --- | --- | --- | --- | --- |
| /com/ Information_Technology/ Company A | acquire | /Information Technology Company/Software/ Company B | Company A Acquires Company B | [Company] acquire[ITCompany] |
| /com/ Information_Technology/ Company A | buy | Information Technology Company/Software/ Company B | Company A buys Company B | [Company] buy [ITCompany] |
| /com/ Information_Technology/ Company A | acquire | Information Technology Company/Software/ Company C | Company A Completes acquisition of Company C | [Company] [token] + [acquisition] [token] + [ITCompany] |

For the current inserted triple row (subject, relationship, and object), the semantic metadata from the NLP processing component is obtained to get the NLP pattern under the node uima.tt.SentenceAnnotation by using an XPath expression or similar mechanism. For example, the sentence "Company A Acquires Company B" will have the semantic metadata shown in ontology 502 in FIG. 5 for highlighting displayed text. Retrieving the immediate children under uima.tt.SentenceAnnotation results in the retrieval of a generic NLP pattern having the form [Company] Token [Token]. If the retrieve pattern is [entity] token [entity], the token is substituted with the value retrieved from the relationship column from Table 1. Thus the first two NLP patterns are derived, such as [Company] acquire [ITCompany] and [Company] buy [ITCompany].

Figure 5:
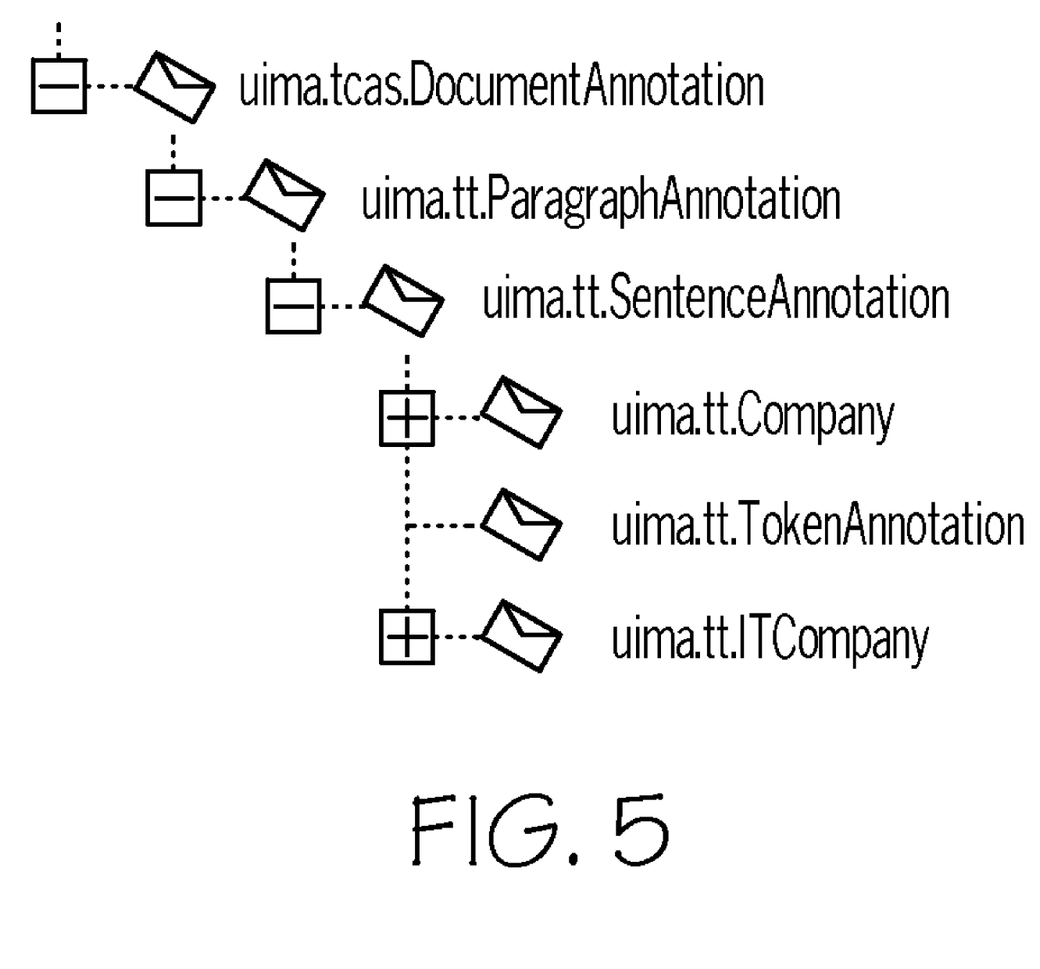
FIG. 5 depicts an exemplary ontology for triples used to automatically highlight displayed text.

If the retrieve pattern is not [entity] token [entity], the original UIMA semantic patterns are used, and the semantic related derived words found in the sentence are used to reverse engineer the NLP pattern. For example, in Table 1, row 3, the original text is "Company A Completes acquisition of Company C". The semantic metadata after the NLP is [Company] [token] [token] [token] [ITCompany]. Since the verb annotated is "acquire", a synonym base can be consulted to discover that "acquire" (verb) is semantically related to "acquisition" (noun) and thus the NLP pattern becomes [Company] [token] [acquisition] [token] [ITCompany].

These derived NLP patterns are then converted into regular expression to allow processing multiple sentence forms that match the pattern. For example, "[Company] [token] [token] [acquisition] [ITCompany]" and "[Company] ([token]+) [acquisition] [ITCompany]" (where ([token]+) indicates that there might be more than one token) are stored as generalized NLP patterns in an NLP pattern column (shown in Table 1 under the NLP pattern column).

Referring again to FIG. 4, a multi-dimensional linguistics profile based on the text highlight for the user is then generated (block 408). This multi-dimensional linguist profile defines entities, relationships and attributes associated with document text. In one embodiment, this is performed by classifying a user's highlighting behavior into multi-dimensional patterns based on the user's highlighting behavior. This highlighting behavior can be classified into the following linguistic dimension patterns:
Categorizing a page;
Establishing relationship between entities; and
Establishing attribute in an entity.

For each user, the dominant and secondary profile of that user is discovered and established by tracking the highest two frequency patterns discovered from the semantic repository. For example, John Doe tends to highlight company acquisitions and categorized ITCompanies while Jane Doe tends to highlight product relationships and product attributes, such as memory requirements. As a result, the following dominant and secondary relationships shown in Table II may be produced.

TABLE II

| Person | Entity | Relationship | Attribute |
|---|---|---|---|
| John Doe | Dominant [ITCompany] | Dominant [ITCompany] acquire [ITCompany] | Dominant [ITCompany] cost [currency] |
| | Secondary [Standard] | Secondary [ITCompany] merge [ITCompany] | Secondary [ITCompany] founded [date] |

TABLE II-continued

| Person | Entity | Relationship | Attribute |
|---|---|---|---|
| Jane Doe | Dominant [Product] | Dominant [Product] prerequisite [Product] | Dominant [Product] memory [number] |
| | Secondary [Standard] | Secondary [Product] support [Standard] | Secondary [Product] revenue [currency] |

For grouping individuals into common interests groups, clustering and back-off algorithms are used based on the ontology to group users with similar or common interests. A user's most dominant and secondary linguistic patterns are persisted, as well as user grouping in the repository.

With reference now to block 410, pattern matching is then applied to the text content, such that text in the second document that has been located in a search is compared with the multi-dimensional linguistic profile. Each sentence in the text content (e.g., of a webpage or other content identified by a uniform resource locator (URL)) is scanned to match the user profile's NLP dominant pattern. If an exact match is found, the text matching the pattern in the new webpage (e.g., the second webpage shown in FIG. 3) is highlighted. If the dominant pattern does not yield an exact match, this process is repeated using the secondary profile as a search criteria until a confidence level is reached to support highlighting text in the second document based on the comparison of the text in the second document with the multi-dimensional linguistic profile. The automatic highlighting of text uses previously discovered and mined patterns based on the user's previous highlighting behavior. In one embodiment, exact pattern matching is not required, but rather a portion of the NLP pattern is utilized, in order to generate a highly-correlated semantic profile (block 412).

If exact pattern matching does not yield results, a semantic relatedness algorithm is utilized to match entities within the NLP pattern. A context window containing the entire sentence text (e.g., displayed content 202 shown in FIG. 2) is scanned. Each token in this window is then compared against the relationship attribute by a semantic similarity measure. Heuristics are then applied to the triple's ontology. For example, the verb "purchase" contains a hypernym, or parent concept: "acquisition." This relationship proves useful in most semantic relatedness measures, as the term to compare, "purchase," would have high semantic relatedness to the verb "acquisition" already existing as a relationship in the triplet record. In one embodiment, relatedness is measured using an algorithm such as the Leacock-Chodorow algorithm:

$$sim_{LC}(c1, c2) = -\log\frac{len(c1, c2)}{2D}$$

where D is the depth of the taxonomy (the depth for the taxonomy tree linking the concepts), and len (c1,c2) is the shortest distance (total distance traversed through the taxonomy tree) between concept 1 and concept 2. That is, wherein the NLP pattern is based on a relatedness between a first concept identified by a first triple in the first displayed content and a second concept identified by a second triple in the second displayed content, wherein the relatedness is measured using the Leacock-Chodorow algorithm. In this case, the depth for "purchase" is 1 (since "acquisition" is the parent of "purchase"), whereas the depth for "buy" is 2 (the parent's parent of "buy" is "acquisition"). But since the equation uses the taxonomy depth to normalize the result, the similarity value will be the same. This is as expected considering the relationship between "purchase" and "buy" versus "acquisition." However, if a second verb is located (e.g. "[ITCompany] anticipated the purchase of [ITCompany]"), two candidate relationship types exist: "anticipate" and "purchase." "Anticipate" appears 2 levels below the root level, as a child of "evaluate" and a grandchild of "think," as opposed to the more direct child-parent relationship between "purchase" and "acquisition." Since the taxonomy depth is lower, but the distance is greater, the negative log value is lower for "anticipate" versus "purchase." Thus, the token having the highest average similarity measured against the relationship type field based on matching NLP pattern records would be the most likely token chosen for the scanned text.

As described above, the present disclosure presents the following exemplary steps, some or all of which are executed by a processor. First, a user (or logic emulating a user) highlights and semantically annotates certain text in a passage (e.g., text from a webpage, photos from a webpage, etc.). The user employs the semantic highlighter system and, by doing so, trains the system on the user's interests. For each highlight, the user also creates semantic annotations (triple statements) associated with the highlights. The system/process described above generates a Natural Language Processing (NLP) pattern for the highlighted text. Using the frames approach to NLP, the system determines what linguistic pattern would correctly parse the highlighted text into its associated semantic triple. Using all semantic triple statements for a specific user and a full body of statements for all users, the system attempts to group the user with other users of similar interest and then, for each interest group, to develop a multi-dimensional profile for each. The profile defines three key dimensions: entities, verbs/relationships, and attributes. For instance, the system may discover that a certain group of people are interested in: The entity/company/IT company/ semiconductors; the verb "acquisition" or "acquire" (i.e. they want to know about acquisitions in this industry); and the properties "date" and "money" (i.e. they want to know when the acquisition happened and how much was paid). This multi-dimensional profile allows the system to begin to recognize potential pre-highlights. It is expressed both as a dominant profile and secondary profile. Next, a highly-correlated semantic profile is generated by leveraging a thesaurus system such that the multi-dimensional profile is expanded (e.g., "acquisition" is expanded to include "acquire", "was acquired", "buy", "bought", "purchased"). This multi-dimensional profile is thereafter applied to new text (e.g., from another webpage). When this user visits this next webpage, the semantic highlighter of the system pre-highlights the new text by applying the profile created to all the text on the new page. This is done in a two step process. Step one is a text scan used on the expanded terms associated with the dominant profile. For any matches, step two then does NLP processing to determine if any of the frame profiles match the profile of this user.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A method to pre-highlight text that is located in a search, said method comprising:
   receiving a text highlight and a triple statement semantic annotation based on said text highlight of a first document, wherein said triple statement semantic annotation comprises a subject, a relationship and an object;
   a processor generating a natural language processing (NLP) pattern based on said triple statement semantic annotation, wherein said NLP pattern is representative of a linguistic pattern between said text highlight and said triple statement semantic annotation;
   generating a multi-dimensional linguistic profile based on said text highlight, said triple statement semantic annotation and said NLP pattern, wherein said multi-dimensional linguistic profile defines entities, relationships and attributes associated with document text;
   comparing text in a second document that has been located in a search with said multi-dimensional linguistic profile; and highlighting text in said second document based on the comparison.

2. The method of claim 1, wherein the text highlighted in the first document was manually highlighted by a user.

3. The method of claim 1, wherein the text highlighted in the first document was automatically highlighted by a logic that utilizes known interests of a specific user.

4. The method of claim 1, wherein the text highlighted in the first document was automatically highlighted by a logic that utilizes known interests of a group of users.

5. The method of claim 1, wherein the NLP pattern is based on a relatedness between a first concept identified by a first triple in the first displayed content and a second concept identified in a second triple in the second displayed content, wherein the relatedness is measured using the algorithm $$sim_{LC}(c1, c2) = -\log\frac{len(c1, c2)}{2D}$$

wherein D is a depth of a taxonomy tree linking the first and second concepts, and wherein len (c1,c2) is the shortest distance between the first concept and the second concept on the taxonomy tree.

6. The method of claim 1, wherein the first document is from a first webpage, and wherein the second document is from a second webpage.

7. A computer system comprising:
a central processing unit; and
a computer readable memory coupled to the central processing unit, wherein the computer readable memory comprises software which, when executed, causes the central processing unit to implement:
receiving a text highlight and a triple statement semantic annotation based on said text highlight of a first document, wherein said triple statement semantic annotation comprises a subject, a relationship and an object;
a processor generating a natural language processing (NLP) pattern based on said triple statement semantic annotation, wherein said NLP pattern is representative of a linguistic pattern between said text highlight and said triple statement semantic annotation;
generating a multi-dimensional linguistic profile based on said text highlight, said triple statement semantic annotation and said NLP pattern, wherein said multi-dimensional linguistic profile defines entities, relationships and attributes associated with document text;
comparing text in a second document with said multi-dimensional linguistic profile; and
highlighting text in said second document based on the comparison.

8. The computer system of claim 7, wherein the text highlighted in the first document was manually highlighted by a user.

9. The computer system of claim 7, wherein the text highlighted in the first document was automatically highlighted by a logic that utilizes known interests of a specific user.

10. The computer system of claim 7, wherein the text highlighted in the first document was automatically highlighted by a logic that utilizes known interests of a group of users.

11. The computer system of claim 7, wherein the NLP pattern is based on a relatedness between a first concept identified by a first triple in the first displayed content and a second concept identified in a second triple in the second displayed content, wherein the relatedness is measured using the algorithm $$sim_{LC}(c1, c2) = -\log\frac{len(c1, c2)}{2D}$$

wherein D is a depth of a taxonomy tree linking the first and second concepts, and wherein len (c1,c2) is the shortest distance between the first concept and the second concept on the taxonomy tree.

12. The computer system of claim 7, wherein the first document is from a first webpage, and wherein the second document is from a second webpage.

13. A computer program product comprising a computer readable non-transitory storage medium embodied therewith, the computer readable storage medium comprising:
computer readable program code configured to receive a text highlight and a triple statement semantic annotation based on said text highlight of a first document, wherein said triple statement semantic annotation comprises a subject, a relationship and an object;
computer readable program code configured to generate a natural language processing (NLP) pattern based on said triple statement semantic annotation, wherein said NLP pattern is representative of a linguistic pattern between said text highlight and said triple statement semantic annotation;
computer readable program code configured to generate a multi-dimensional linguistic profile based on said text highlight, said triple statement semantic annotation and said NLP pattern, wherein said multi-dimensional linguistic profile defines entities, relationships and attributes associated with document text;
computer readable program code configured to compare text in a second document with said multi-dimensional linguistic profile; and
computer readable program code configured to highlight text in said second document based on the comparison.

14. The computer program product of claim 13, wherein the text highlighted in the first document was manually highlighted by a user.

15. The computer program product of claim 13, wherein the text highlighted in the first document was automatically highlighted by a logic that utilizes known interests of a specific user.

16. The computer program product of claim 13, wherein the text highlighted in the first document was automatically highlighted by a logic that utilizes known interests of a group of users.

17. The computer program product of claim 13, wherein the NLP pattern is based on a relatedness between a first concept identified by a first triple in the first displayed content and a second concept identified in a second triple in the second displayed content, wherein the relatedness is measured using the algorithm $$sim_{LC}(c1, c2) = -\log\frac{len(c1, c2)}{2D}$$

wherein D is a depth of a taxonomy tree linking the first and second concepts, and wherein len (c1,c2) is the shortest distance between the first concept and the second concept on the taxonomy tree.

18. The computer program product of claim 13, wherein the first document is from a first webpage, and wherein the second document is from a second webpage.

* * * * *